(12) United States Patent
Kim

(10) Patent No.: US 6,237,340 B1
(45) Date of Patent: May 29, 2001

(54) METHOD FOR REUSING A SUBSTANCE'S THERMAL EXPANSION ENERGY

(76) Inventor: Chang Sun Kim, 358-7 Namchon-Dong, Namdong-Gu, Inchun-Shi (KR)

( * ) Notice: Subject to any disclaimer, the term of this patent is extended or adjusted under 35 U.S.C. 154(b) by 0 days.

(21) Appl. No.: 09/459,914

(22) Filed: Dec. 14, 1999

(30) Foreign Application Priority Data

Jun. 18, 1999 (KR) .................................................. 99-22962

(51) Int. Cl.⁷ .................................................. F01K 25/06
(52) U.S. Cl. .................................. 60/649; 60/651; 60/671
(58) Field of Search ............................. 60/648, 649, 651, 60/671

(56) References Cited

U.S. PATENT DOCUMENTS

| | | | |
|---|---|---|---|
| 4,729,226 | * | 3/1988 | Rosado ................................... 60/649 |
| 4,760,706 | * | 8/1988 | Nasser ................................. 60/649 X |
| 5,557,936 | * | 9/1996 | Drnevich ................................. 60/649 |

* cited by examiner

*Primary Examiner*—Hoang Nguyen
(74) *Attorney, Agent, or Firm*—Birch, Stewart, Kolasch & Birch, LLB

(57) ABSTRACT

A method for reusing substance's thermal expansion energy wherein the first given thermal expansion energy can be reused by repeating chemical bonding and electrolysis of a substance is based on raising a first given thermal energy by using chemical bonding, etc. in addition to the principle that the substance absorbs heat as its volume increases but emits heat as the volume decreases. The method is effective for saving energy resources and minimizing fuel consumption as well as greatly decreasing pollution even in the field of applications requiring massive energy such as power plants and rockets.

18 Claims, No Drawings

METHOD FOR REUSING A SUBSTANCE'S THERMAL EXPANSION ENERGY

BACKGROUND OF THE INVENTION

1. Field of the Invention

The present invention relates to a method for reusing the thermal expansion energy of a substance and, more particularly, to a method for reusing the expanded substance, using the thermal expansion energy from heating the substance. The substance is thermal expansion energy is used as expansion energy, and the expanded substance can be reused by raising the substance to a high temperature range the first given heat getting a lift chemical bond from the energy of the expanded substance, which applies a mechanism that the bonding energy is equal to the decomposing energy

2. Description of Related Art

Until now, the heat used to increase the temperature of a substance for example, water, and expand the substance, has been disposed without a reusing procedure as it is emitted after a one time expansion of the substance. For example, a boiler in a general power plant is heated to convert water into high-pressure water vapor, which is used for driving a turbine and then converted to a low-temperature water vapor with a large volume.

This water vapor is cooled and radiates heat using seawater etc., in order to be condensed into water again. Water vapor changes into water after radiating all the heat first given in a boiler. And then, the water is infused into the boiler and heated again to generate a high-pressure water vapor. This procedure is repeated.

In general, a propulsive energy from matter for example, power plants, rockets and the like obtains propulsive energy from bond reaction of hydrogen and oxygen. That is, the method for using thermal expansion energy of the conventional substance is limited to only the first exothermal expansion, for example, $H_2+O$—(the first exothermal expansion ↑)→$H_2O$(shrinkage).

Therefore, the energy required for the thermal expansion is not reused and all the first given heat in the power plant is radiated through the repeated procedure of heating and cooling. This causes waste of energy resources and air pollution such as thermal pollution, and involves a problem that enormous energy needed to propel artificial satellites also depends on the only the first expansion energy.

SUMMARY OF THE INVENTION

Accordingly, it is an object of the present invention to provide a method for reusing a substance's thermal expansion energy wherein the first given thermal expansion energy can be reused by repeating chemical bonding and electrolysis of a substance, and is based on getting a lift in the first given thermal energy by using chemical bonding etc. in addition to the principle that the substance absorbs heat as its volume increases but emits heat as the volume decreases, for saving energy resources and minimizing fuel as well as greating decreasing pollution even in the field of applications requiring a mass of energy such as power plants and rockets.

Another object of the present invention is to provide a method for reusing substance's thermal expansion energy through getting a lift at high temperature from a low-temperature heat diffused in the substance by repeated combination of a metal with water or oxygen and decomposition of the product of metal oxide, whereby the method consists of the steps: (a) raising the temperature of the substance with an increase in the pressure; (b) increasing the volume of the substance with an increase in the temperature; (c) providing the specific heat of the substance in inverse proportion to the specific gravity; (d) increasing the specific gravity of the substance as the metal combines with oxygen to generate heat and generating the heat as the space between molecules or atoms of the substance is reduced; and (e) providing a chemical bonding energy equal to a decomposition energy wherein the heat is not used or consumed, but diffused into the space.

Other objects and further scope of applicability of the present invention will become apparent from the detailed description give hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description

DETAILED DESCRIPTION OF PREFERRED EMBODIMENT

Referring now in detail for the purpose of illustrating preferred embodiments of the present invention, a method for reusing substance thermal expansion energy will be described as follows.

First and second principles of the present invention are based on the Charles's law that at constant pressure, the volume of a fixed mass or quantity of gas is varies directly with the absolute temperature. That is, according to the first mechanism, the temperature of a substance such as gas, liquid or solid rises as the pressure increases and drops with the pressure decreased. This mechanism is especially true for the gas state. According to the second mechanism, the volume of a substance increases as the substance absorbs heat, and decreases as the substance emits heat.

According to the third mechanism, the specific heat of a substance increases inversely with an increase in the specific gravity. For example, the hydrogen gas and the pure water have the highest specific heat.

According to the fourth mechanism, when a metal combines with oxygen, a moment heat occurs and the specific gravity increases, but the molecular or atomic volume decreases after cooling. For example, when the light metals such as K, Na, Mg, Ca, Be, Li or Al combine with oxygen, the caloric value and temperature of the substance dramatically increases and after cooling, the metal oxide thus produced has higher specific gravity than the pure metal. That is, the comparison of the specific gravity is that $2Na<Na_2O$, $Mg<MgO$, $2Al<Al_2O_3$.

This means that the substance emits much heat such at high temperature as the molecular or atomic volume of the substance is dramatically reduced.

For another example, there is arranged for a reaction that can be expressed by:

$H_2+O$—(a moment exothermal expansion ↑)→$H_2O$ (shrinkage)→$H_2O+2Na$ —(exothermal expansion ↑)→$H_2+Na_2O$(shrinkage).

Supposed that the volume of hydrogen $H_2$ is $1.H_2V$ and the volume of oxygen O is $1.OV$, the resulting product has volume dramatically decreased to $1.H_2V+1.OV=1.H_2OV$ to reduce the thermal space, so that the temperature is increased by increasing thermal pressure through shrinkage of thermal space.

As seen from the reaction, $H_2O+2Na$ —(a moment exothermal expansion ↑)→$H_2+Na_2O$ (shrinkage), hydrogen is decomposed with the volume of 1V ($H_2$) and the volume decreases as oxygen combines with 2Na. Thus, it is found that the volumes of oxygen and Na are further reduced and that lots of heat is generated sufficient to compensate for the decomposition heat of the hydrogen.

The fifth mechanism is that the bonding energy is equal to the decomposing energy. The specific heat increases with an increase in the thermal space for the molecules of the substance and the substance generates heat as the thermal space for the molecules decreases. The more heat is generated, the stronger is chemical bond. With energy as much as the bonding heat, the volume of the substance returns to the original state.

The sixth mechanism is that heat is not used or consumed but diffused into the interval space. That is, the substance absorbs much heat when a phase transition occurs from liquid to gas, and emits the same quantity of heat when a phase transition occurs from gas to liquid, so that the volume of the substance has a relative relationship with the temperature. It is thus found out that the substance emits heat with an increase in the thermal pressure as the internal space of the substance decreases.

In addition, emission or absorption of heat occurs due to the relationship with the thermal volume of the space between the molecules or atoms, and a thermal space or thermal concentration occurs as heat occupies the space between the molecules or atoms. Therefore, heat is not used or consumed but diffused into the space. In connection with all the characteristics of heat, there can be given a description as to the mechanism in which a metal repeatedly has chemical bonding and decomposition reactions with water or oxygen, followed several times of exothermal expansion.

Approximately 639 cal of heat is required to completely change 1 g of water (0° C.) to water vapor. This can be expressed by:

$H_2O$ (1 g)+639 cal (Expression A)≈pressure of 170 kg/cm² and temperature of 639° C. (Expression B)→after expansion→22.4 liters of water vapor (100° C.)/18 (molecular weight) and pressure of 1 kg/cm² (Expression C).

That is, (Expression A)→(Expression B)→expansion→(Expression C).

Thus, the substance has high expansion strength when the Expression A is changed to Expression B, and the Expression B becomes the Expression C after the expansion.

However, the temperature is lowered as the thermal space is expanded with the volume of the substance increases about 1244 times, since the heat in the Expression A still exists in the water vapor For expedience, the above situation can be defined as:

Temperature 100° C.—1C, 1 g of water (liquid state, 0° C.)—1.$H_2O$,

Atmospheric Pressure 1 kg/cm²—1P, 1 g of water vapor—$SH_2O$,

Volume 1244 cc—1V.

If the vaporized water C.P.V.$SH_2O$ is decomposed with Na, the reaction can be expressed by:

1.$H_2O$+639cal(Expression 1)—(expansion(1)↑)→C.P.V.SH2O+2Na (Expression 2)—(a moment exothermal expansion(2)↑)→$H_2$+Na2O (Expression 3).

In the Expression 3, Na2O—(electrolysis; endothermic energy (1))→2Na+O (Expression 4).

O of the Expression 4 combines with $H_2$ of the Expression 3, which repeats the reaction given by:

$H_2$+O (Expression 5)—(exothermal expansion (3)↑)→C.P.V.$H_2O$+2Na (Expression 6), wherein 2Na of Expression 6 is 2Na of Expression 4.

It is that the chemical reaction repeats as the Expression 6 is converted to Expression 2.

To describe the Expressions 1–6, the total heat generated in the exothermal expansion (2) of the Expression 2 and in the exothermal expansion (3) of the Expression 5 is equal to the electrolysis energy of the Expression 4 plus 639 cal of heat given in the Expression 1. That is, the exothermal expansion heat (2)+the exothermal expansion heat (3)= electrolysis energy+source heat 639 cal. The temperature of the substance is always high with the source heat of 639 cal as 2Na and $H_2O$ repeats combination and decomposition.

For example, the above stated method of reusing the thermal expansion energy can be applied to a device such as rocket engine as follows.

The starting material is $H_2O$, Na and O and the reaction can be given by:

$H_2O$+2Na (Expression 1)—(the first exothermal expansion ↑)→$H_2$ (generated) +$Na_2O$ (Expression 2).

Using $H_2$ of the Expression 2, the reaction proceeds as follows:

$H_2$+O (added) (Expression 3)—(the second exothermal expansion ↑)→$H_2O$+2Na (added) (Expression 4)—(the third thermal expansion ↑)→$H_2$+Na2O (Expression 5)→it's possible continuously.

Using $H_2$ of the Expression 5, the reaction proceeds repeatedly as follows:

H2+O (Expression 5)—(fifth exothermal expansion ↑)→$H_2O$.

Several times the thermal expansion energy can be obtained by adding Na and O of sufficient quantities to react with an appropriate quantity of water. This makes it possible to use pure water without hydrogen to reduce dramatically the energy resources.

The same effect can be achieved using K, Na, Mg, Ca, Al, Be, Li and the like.

The reason that the present invention uses Na lies in that Na is liquefied at a low temperature and reactive with water even at a low temperature and its oxide Na2O has a very low melting point with low production cost.

As mentioned above, the atom has a latent high-density heat, a small internal thermal space for latent heat thereof, and a simple chemical bond which increases the density of the substance and decreases the volume, thereby generating heat from the space. As the generated energy is added to the substance, the substance is restored to its original state. Based on this principle, after using the first given thermal expansion energy, without being dispersed, the low-pressure and low-temperature heat is used getting raised again in the chemical bond and heat generation, and the first given heat increases the temperature through getting raised in the next bonding. This procedure is repeated.

In the case where the chemical bonding energy is used to decompose the substance, the first given energy is not wastefully disposed but used repeatedly to prevent waste of fossil fuels or other heat energy and maximizing the energy efficiency. This settles the problem of air and water pollution as well as protects all resources in the earth.

The present invention as stated above is applicable to various fields of application including power plants and rockets, etc., which also belongs to the present invention in an aspect that the thermal expansion energy is reused by using a chemical oxidation bond.

As described above, the present invention can reuse the first given thermal expansion energy by repeating combination and decomposition of a substance based on the mechanism that the substance absorbs heat as its volume increases but emits heat as the volume decreases, thereby reducing unit cost or production cost as well as decreasing pollution even in the field of applications requiring a mass of energy such as power plants and rockets.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for reusing a substance's thermal expansion energy, the method being characterized by water of 0° C. and a metal react to generate heat and $H_2$+metal oxide are again consumed as bonding and decomposing energy of elemental metal+$H_2O$, and heat diffused in water vapor gets raised by reacting the water vapor at 100° C. with elemental metal, compensating above the decomposing energy and putting out the heat energy diffused in water vapor, said method comprising of the steps:

(a) raising a temperature of the substance with an increase in pressure;

(b) increasing a volume of the substance with an increase in the temperature;

(c) providing a specific heat of the substance in inverse proportion to specific gravity of the substance;

(d) increasing the specific gravity of the substance as a metal combines with oxygen to generate heat wherein the heat is generated as space between molecules or atoms of the substance is reduced; and (e) providing a chemical bonding energy equal to a decomposition energy, wherein the heat is not used or consumed but diffused into the space.

2. The method as claimed in claim 1, wherein the metal is at least one selected from the group consisting of K, Na, Mg, Ca, Al, Be, and Li.

3. The method as claimed in claim 1, wherein the method cycles by repeated chemical bonding and electrolysis of the substance.

4. The method as claimed in claim 1, wherein the metal is Na and the metal oxide is $Na_2O$.

5. The method as claimed in claim 1, wherein the metal is Mg and the metal oxide is MgO.

6. The method as claimed in claim 1, wherein the metal is Al and the metal oxide is $Al_2O_3$.

7. The method as claimed in claim 1, wherein the method has the following reaction sequence:

$H_2+O \rightarrow H_2O \rightarrow H_2O+2Na \rightarrow H_2+Na_2O$.

8. The method as claimed in claim 1, wherein the method uses $H_2O$, Na and O as starting materials.

9. The method as claimed in claim 1, wherein the method has the following reaction sequence:

$H_2O+2Na \rightarrow H_2+Na_2O \rightarrow H_2+O(added) \rightarrow H_2O+2Na$ (added).

10. The method as claimed in claim 1, wherein the method has the following reaction sequence:

$H_2O+2Na+639$ cal$\rightarrow H_2+Na_2O$+exothermal energy+639 cal;

$Na_2O$+endothermic energy(electrolysis)$\rightarrow 2Na+O$;

$H_2+O+639$ cal$\rightarrow H_2$+exothermic energy+639 cal;

the method using $H_2O$, Na and O as starting materials and the reaction sequences using a case of 1 g of water vapor at 100° C.

11. The method as claimed in claim 4, wherein the method has the following reaction sequence:

$H_2+O \rightarrow H_2O \rightarrow H_2O+2Na \rightarrow H_2+Na_2O$.

12. The method as claimed in claim 4, wherein the method uses $H_2O$, Na and O as starting materials.

13. The method as claimed in claim 4, wherein the method has the following reaction sequence:

$H_2O+2Na \rightarrow H_2+Na_2O \rightarrow H_2+O(added) \rightarrow H_2O+2Na$ (added).

14. The method as claimed in claim 4, wherein the method has the following reaction sequence:

$H_2O+2Na+639$ cal$\rightarrow H_2+Na_2O$+exothermal energy+639 cal;

$Na_2O$+endothermic energy(electrolysis)$\rightarrow 2Na+O$;

$H_2+O+639$cal$\rightarrow H_2O$+exothermic energy+639 cal;

the method using $H_2O$, Na and O as starting materials and the reaction sequences using a case of 1 g of water vapor at 100° C.

15. The method as claimed in claim 1, said method being used to propel a rocket.

16. The method as claimed in claim 1, said method being used to propel a rocket.

17. The method as claimed in claim 1, said method being used in a power plant.

18. The method as claimed in claim 4, said method being used in a power plant.

* * * * *